UNITED STATES PATENT OFFICE.

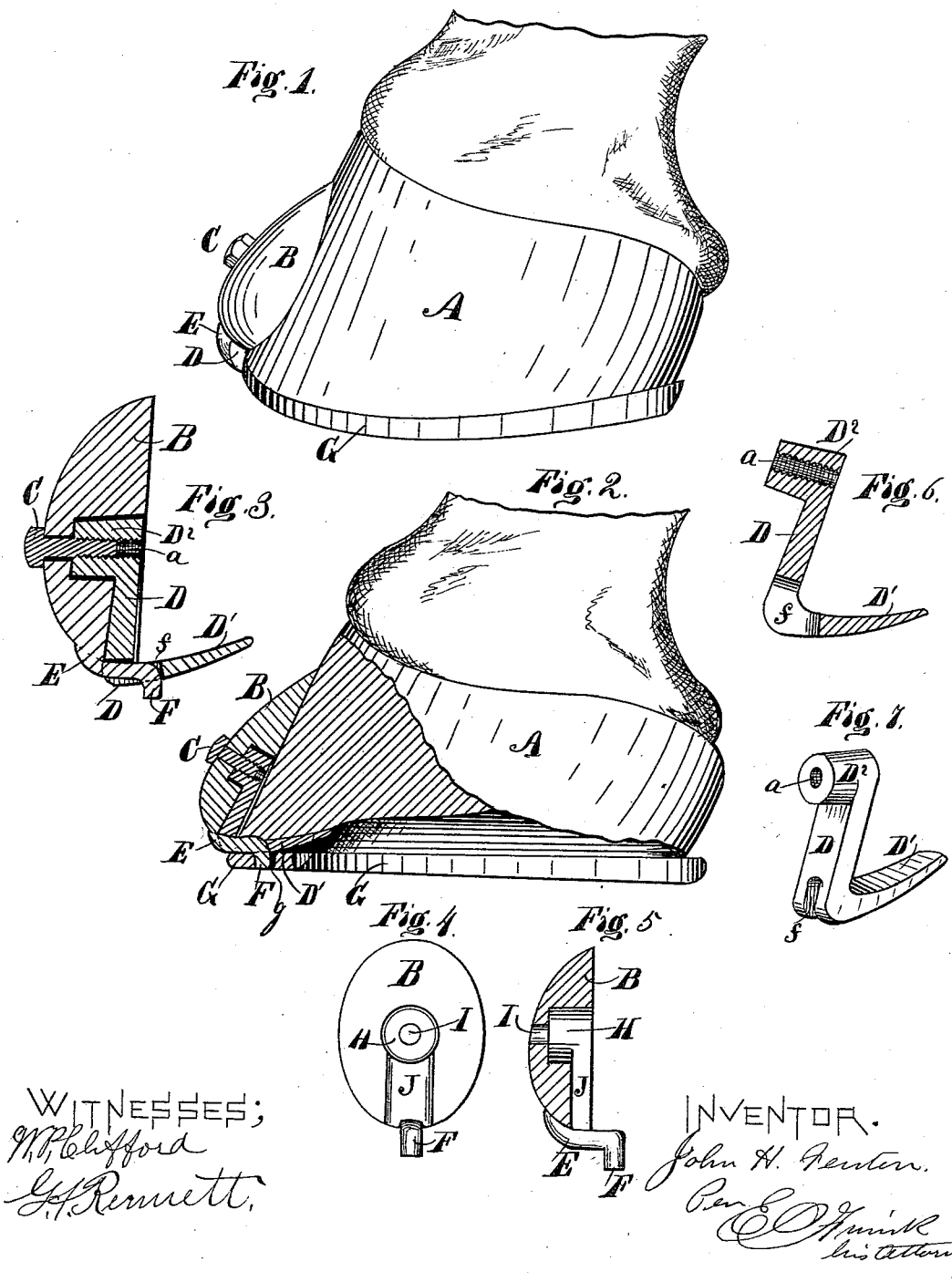

JOHN H. FENTON, OF INDIANAPOLIS, INDIANA.

TOE-WEIGHT.

SPECIFICATION forming part of Letters Patent No. 226,295, dated April 6, 1880.

Application filed September 27, 1879.

*To all whom it may concern:*

Be it known that I, JOHN H. FENTON, of Indianapolis, in the county of Marion and State of Indiana, have invented a new and useful Improvement in Toe Weights and Fastenings for Horses, of which the following is a description, reference being had to the accompanying drawings.

The object of my invention is to provide a toe-weight with a means of securing it to the hoof and shoe of a horse, so that the weight will be firmly secured thereto without the aid of straps or the welding of a spur or projecting piece to the shoe.

My invention consists, mainly, in the new construction and arrangement of devices, and in the new combination of elements which are deemed essential in my newly-constructed toe weight and fastening, which will be first fully described in the specification, and then set forth in the claims.

In the accompanying drawings, in which like letters of reference in the different figures indicate like parts, Figure 1 represents a perspective view of a horse's hoof, showing my improved toe weight and fastening attached to the shoe. Fig. 2 is a sectional view of the same, showing the arrangement of parts more fully. Fig. 3 is a sectional view of the weight and fastening-spur. Fig. 4 is a plan view of the rear side of the weight. Fig. 5 is a sectional view of Fig. 4. Fig. 6 is a sectional view of the fastening-spur, and Fig. 7 is a perspective view of the same.

A represents the hoof; G, the shoe; B, the weight, and D D' the fastening-spur.

The shoe G is provided with a small hole, $g$, Fig. 2, in the center at the front, to receive the hook F of the weight.

The weight B is provided with a cylindrical recess, H, in the rear side, having a small bolt-hole, I, extending through the weight in the center. A recess, J, is also formed in the rear side of the weight, and extends from the cylindrical recess H to the base of the weight.

The hook E F is cast on the lower edge of the weight, and projects rearward with a form similar to that shown in Fig. 5. The point F is designed to fit into the hole $g$ in the shoe, as shown in Figs. 2 and 3.

The spur D D' is constructed similar to that shown in Figs. 6 and 7—that is, the upper part is provided with a boss, $D^2$, having a hole, $a$, provided with a female screw to receive the bolt C. The lower part of the shank D is provided with a notch, $f$, that extends part way up in the shank D and part way into the spur D', as shown in Fig. 6. The spur D' projects back, so as to fit under the hoof, as shown in Fig. 2.

Having thus described the construction and arrangement of parts, I will now describe the mode or manner of attaching the weight to the hoof and shoe of a horse, as follows, to wit:

The spur D' is first inserted in a notch formed in the base of the hoof and between the hoof and shoe. The weight is then placed in position on the front of the hoof by inserting the hook-shank E into the notch $f$ of the spur, and the hook F is inserted in the hole $g$ of the shoe G, as shown in Fig. 2, after which the bolt C is inserted in the hole I of the weight and screwed fast in the hole $a$ of the spur, thus clamping the spur D D' and weight B to the shoe G and hoof A, as shown in Fig. 2. The weight thus secured to the shoe and hoof is permanently fastened, and cannot get loose or come off until the bolt C is unscrewed.

What I claim as new, and desire to secure by Letters Patent, is—

1. The weight B, provided with the recesses H and J, the hole I, and hook E F, as and for the purpose specified.

2. The weight B, provided with the recesses H and J, the hole I, and hook E F, combined with the spur D D' $D^2$, the shoe G, and bolt C, as and for the purpose specified.

3. The weight B, provided with the hook E F at its lower edge, as and for the purpose specified.

4. The spur consisting of the parts D D' $D^2$, having a recess, $f$, at the bend or union of the shank D and spur D', substantially as shown and described.

In testimony whereof I have signed my name to this specification in the presence of two subscribing witnesses.

JOHN H. FENTON.

Witnesses:
E. O. FRINK,
G. H. RENNETT.